(12) United States Patent
Watanabe

(10) Patent No.: US 9,046,438 B2
(45) Date of Patent: Jun. 2, 2015

(54) CENTER-OF-GRAVITY DETECTING SYSTEM

(71) Applicant: NATIONAL UNIVERSITY CORP. TOKYO UNIVERSITY OF MARINE SCIENCE AND TECHNOLOGY, Tokyo (JP)

(72) Inventor: Yutaka Watanabe, Tokyo (JP)

(73) Assignee: NATIONAL UNIVERSITY CORPORATION TOKYO UNIVERSITY OF MARINE SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 14/354,401

(22) PCT Filed: Oct. 24, 2012

(86) PCT No.: PCT/JP2012/077437
§ 371 (c)(1),
(2) Date: Apr. 25, 2014

(87) PCT Pub. No.: WO2013/061989
PCT Pub. Date: May 2, 2013

(65) Prior Publication Data
US 2014/0260569 A1 Sep. 18, 2014

(30) Foreign Application Priority Data

Oct. 26, 2011 (JP) ................................. 2011-235073

(51) Int. Cl.
*G01M 1/00* (2006.01)
*G01M 1/22* (2006.01)

(52) U.S. Cl.
CPC ...................................... *G01M 1/22* (2013.01)

(58) Field of Classification Search
CPC .............................. G01M 1/122; G01G 19/08
USPC .................................... 73/65.01, 65.07, 65.08
See application file for complete search history.

(56) References Cited

U.S. PATENT DOCUMENTS

| 8,483,942 B2 | 7/2013 | Watanabe |
| 2006/0010965 A1* | 1/2006 | Mastinu et al. .............. 73/65.07 |
| 2010/0198492 A1 | 8/2010 | Watanabe |
| 2010/0225478 A1* | 9/2010 | McCloskey et al. .......... 340/540 |
| 2013/0104676 A1* | 5/2013 | Yang et al. .................... 73/865.8 |
| 2014/0331748 A1* | 11/2014 | Watanabe .................... 73/65.01 |

FOREIGN PATENT DOCUMENTS

| JP | 56-138230 A | 10/1981 |
| JP | 57-157133 A | 9/1982 |

(Continued)

*Primary Examiner* — Max Noori
(74) *Attorney, Agent, or Firm* — Birch, Stewart, Kolasch & Birch, LLP

(57) ABSTRACT

There is provided a highly versatile center-of-gravity detecting system which can accurately detect the center of gravity of not only a container cargo vehicle but also various detection objects.
It has a placement board for placing a detection object thereon; springs for supporting the placement board with an elastic force; an acceleration sensor for detecting a reciprocating motion of the detection object in an up-down direction; an angular velocity sensor for detecting a simple pendulum motion of the detection object around a roll direction oscillation central axis; and an X-axis restriction guide part for restricting a movement of the placement board in an X-axis direction, a data processing apparatus calculating a center-of-gravity height in the up-down direction from the roll direction oscillation central axis to the center of gravity of the detection object on the basis of the detection results by the acceleration sensor and the angular velocity sensor.

7 Claims, 15 Drawing Sheets

(56) References Cited

FOREIGN PATENT DOCUMENTS

| | | |
|---|---|---|
| JP | 64-21333 A | 1/1989 |
| JP | 6-265433 A | 9/1994 |
| JP | 11-83534 A | 3/1999 |
| JP | 2001-249060 A | 9/2001 |
| JP | 4517107 B2 | 8/2010 |

* cited by examiner

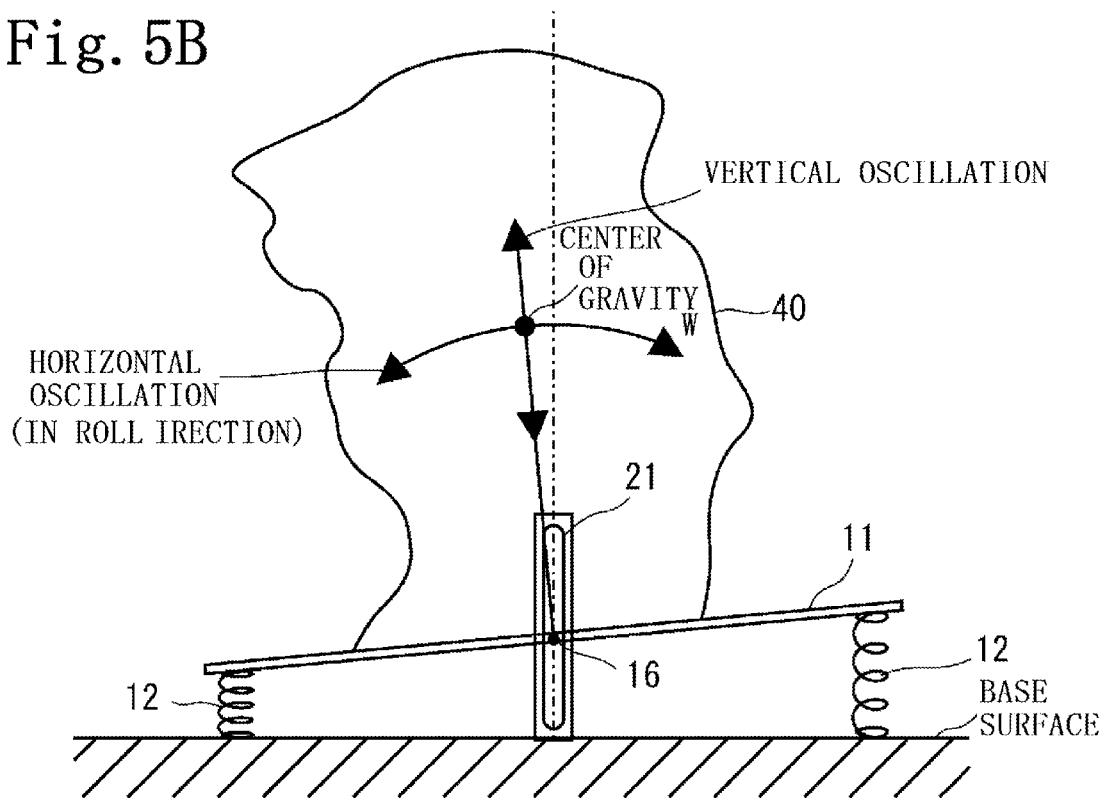

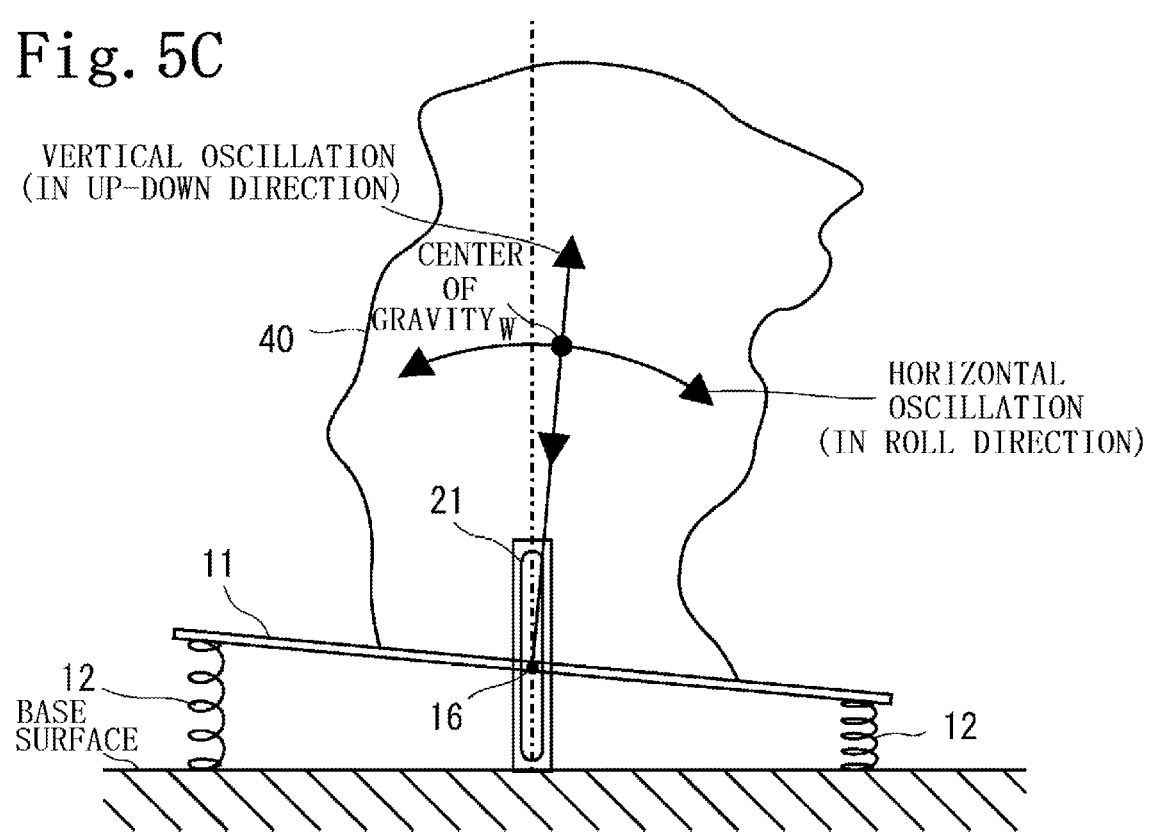

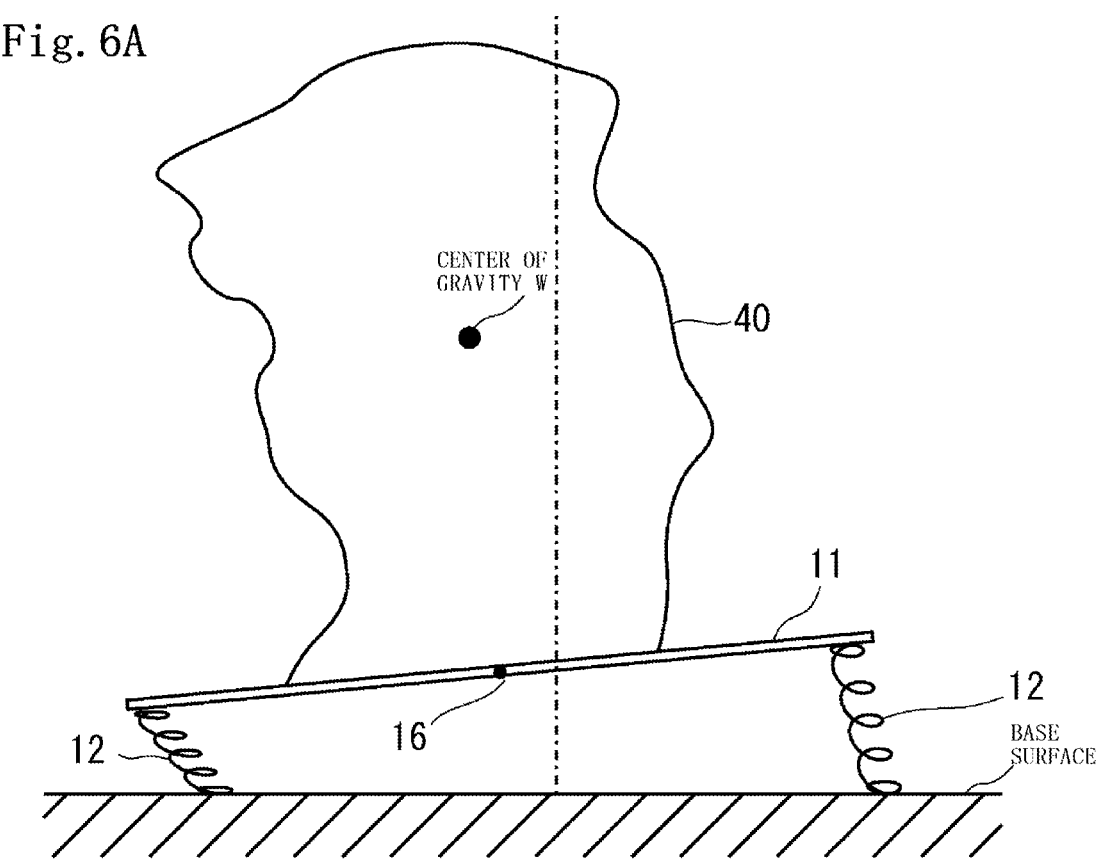

CENTER-OF-GRAVITY DETECTING SYSTEM

TECHNICAL FIELD

The present invention relates to a center-of-gravity detecting system for detecting the center of gravity of a detection object, and particularly to a center-of-gravity detecting system for oscillating a detection object placed on a placement board to detect the center of gravity thereof.

BACKGROUND ART

The present inventor has proposed, in the previous patent application (refer to Patent Document 1), a center-of-gravity detection system for detecting a center-of-gravity location in three-dimensional space of a containerized cargo whose condition of loading is unknown. The center-of-gravity detection system disclosed in Patent Document 1 is provided with an oscillation detector for detecting a vertical oscillation and a horizontal oscillation of a container cargo vehicle and an arithmetic unit. This system is configured such that a vertical oscillation detected by the oscillation detector is made to correspond to a reciprocation motion in an up/down (self-weight) direction in which the center of gravity of the container cargo vehicle is a mass point, while a horizontal oscillation detected by the oscillation detector being made to correspond to a simple pendulum motion in a roll direction in which the axle center of the container cargo vehicle is a support point and the center of gravity of the container cargo vehicle is a mass point, and the arithmetic unit makes an operation to derive the location of the center of gravity of the container cargo vehicle.

The center-of-gravity detection technology disclosed in Patent Document 1 is based on a center-of-gravity detection model as shown in FIG. 11. Herein, with the center-of-gravity detection model shown in FIG. 11, the axle center corresponds to the oscillation central axis, and from the distance between the spring structures, "b", the gravitational acceleration "g", the circular constant "$\pi$", the vertical oscillation frequency in an up-down direction, "v", the horizontal oscillation frequency in a roll direction, "V", and the central angle "$\alpha$", the height of the center of gravity in the up/down direction, "l", from the axle center to the center of gravity W of the container cargo vehicle (detection object) and the center-of-gravity distance in the right-left direction, "s", from the axle center to the center of gravity W of the container cargo vehicle can be determined. Therefore, by detecting the vertical oscillation and the horizontal oscillation using the oscillation detector for determining the vertical oscillation frequency in the up-down direction, "v", the horizontal oscillation frequency in the roll direction, "V", and the central angle "$\alpha$", the height of the center of gravity in the up/down direction, "l", from the axle center to the center of gravity W of the container cargo vehicle (detection object) and the center-of-gravity distance in the right-left direction, "s", from the axle center to the center of gravity W of the container cargo vehicle can be calculated. The central angle "$\alpha$" is an angle formed between a perpendicular center line passing through the axle center and the horizontal oscillation center line giving the center of horizontal oscillation as shown in FIG. 11, and can be determined by detecting the horizontal oscillation of the container cargo vehicle using the oscillation detector.

It is hoped that, by using this center-of-gravity detection model, a highly versatile center-of-gravity detecting system which can accurately detect the center of gravity of not only a container cargo vehicle but also various detection objects is built. By using this center-of-gravity detection model, the center-of-gravity location of even a detection object which has an indeterminate geometry and an unknown weight can be detected in as short as a few seconds, which provides an innumerable number of applicable fields and an immeasurable industrial value. For example, if a compact center-of-gravity detection system of desk-top type can be built, it can be placed on a hand cart, giving an extreme convenience, with the cost of the materials required for manufacture of the system being extremely low.

CITATION LIST

Patent Literature

Patent Document 1
Japanese Patent No. 4517107

DISCLOSURE OF THE INVENTION

Problems to be Solved by the Invention

However, there has been presented a problem that, by simply applying the center-of-gravity detection model shown in FIG. 11, the center of gravity of a detection object other than the container cargo vehicle cannot be accurately detected.

In view of the above problem, the present invention has been made in order to solve the problem of the prior art, and it is an object of the present invention to provide a highly versatile center-of-gravity detecting system which can accurately detect the center of gravity of not only a container cargo vehicle but also various detection objects.

Means for Solving the Problems

The center-of-gravity detecting system in accordance with the present invention provides a center-of-gravity detecting system, including: a placement board for placing a detection object thereon; a supporting means for supporting said placement board with an elastic force; an up-down direction detection means for detecting a reciprocating motion of said detection object in an up-down direction perpendicular to said placement board; a roll direction detection means for detecting a simple pendulum motion of said detection object around a roll direction oscillation central axis parallel to said placement board; an X-axis direction restriction means for restricting a movement of said placement board in an X-axis direction orthogonal to a gravity-acting Z-axis direction and said roll direction oscillation central axis, respectively; and a data processing means for calculating a center-of-gravity height in said up-down direction from said roll direction oscillation central axis to the center of gravity of said detection object on the basis of the detection results by said up-down direction detection means and said roll direction detection means.

Further, in the center-of-gravity detecting system of the present invention, said data processing means may calculate a center-of-gravity distance in a right-left direction orthogonal to said up-down direction and said roll direction oscillation central axis, respectively, from said roll direction oscillation central axis to the center of gravity of said detection object on the basis of the detection results by said up-down direction detection means and said roll direction detection means.

Further, in the center-of-gravity detecting system of the present invention, a pitch direction detection means for detecting a simple pendulum motion of said detection object around a pitch direction oscillation central axis orthogonal to said up-down direction and said roll direction oscillation central axis, respectively; and a Y-axis direction restriction means for restricting a movement of said placement board in a Y-axis direction orthogonal to a gravity-acting Z-axis direction and said pitch direction oscillation central axis, respectively, may be provided, said data processing means calculating a center-of-gravity distance of said detection object on said placement board on the basis of the detection results by said up-down direction detection means and said pitch direction detection means.

Further, in the center-of-gravity detecting system of the present invention, said placement board may have a geometry which is line-symmetrical about said roll direction oscillation central axis and said pitch direction oscillation central axis.

Further, in the center-of-gravity detecting system of the present invention, said supporting means may be comprised of a plurality of spring means having an identical elastic force, and said spring means being disposed line-symmetrically about said roll direction oscillation central axis and said pitch direction oscillation central axis.

Further, in the center-of-gravity detecting system of the present invention, said X-axis direction restriction means may be comprised of said roll direction oscillation central axis which is formed so as to be protruded from both ends of said placement board, and a pair of X-axis restriction guide means for restricting a movement of both ends of said roll direction oscillation central axis in said X-axis direction, respectively, and said Y-axis direction restriction means may be comprised of said pitch direction oscillation central axis which is formed so as to be protruded from both ends of said placement board, and a pair of Y-axis restriction guide means for restricting a movement of both ends of said pitch direction oscillation central axis in said Y-axis direction, respectively.

In addition, the center-of-gravity detecting system in accordance with the present invention provides a center-of-gravity detecting system, including: a placement board for placing a detection object thereon; a supporting means for supporting said placement board with an elastic force; an up-down direction detection means for detecting a reciprocating motion of said detection object in an up-down direction perpendicular to said placement board; a roll direction detection means for detecting a simple pendulum motion of said detection object around a roll direction oscillation central axis parallel to said placement board; a pitch direction detection means for detecting a simple pendulum motion of said detection object around a pitch direction oscillation central axis orthogonal to said up-down direction and said roll direction oscillation central axis, respectively; a movement direction restriction means for restricting a movement of the center of said placement board to said up-down direction; and a data processing means for calculating a center-of-gravity height in said up-down direction from said roll direction oscillation central axis to the center of gravity of said detection object and a center-of-gravity distance of said detection object on said placement board on the basis of the detection results by said up-down direction detection means and said roll direction detection means.

Advantages of the Invention

In accordance with the present invention, there are provided a placement board for placing a detection object thereon; a supporting means for supporting the placement board with an elastic force; an up-down direction detection means for detecting a reciprocating motion of a detection object in an up-down direction perpendicular to the placement board; a roll direction detection means for detecting a simple pendulum motion of the detection object around a roll direction oscillation central axis parallel to the placement board; an X-axis direction restriction means for restricting a movement of the placement board in an X-axis direction orthogonal to a gravity-acting Z-axis direction and the roll direction oscillation central axis, respectively; and a data processing means for calculating a center-of-gravity height in the up-down direction from the roll direction oscillation central axis to the center of gravity of the detection object on the basis of the detection results by the up-down direction detection means and the roll direction detection means, thereby an advantage that, simply by placing a detection object on the placement board, and causing an external disturbance to act thereon, the center-of-gravity height of the detection object can be accurately calculated.

BRIEF DESCRIPTION OF THE DRAWINGS

FIGS. 5A, 5B, and 5C are explanatory drawings for explaining the operation of the oscillation detecting device shown in FIG. 1;

FIGS. 6A and 6B are explanatory drawings for explaining the operation of the oscillation detecting device in the case where no guide parts shown in FIG. 1 are provided;

BEST MODE FOR CARRYING OUT THE INVENTION

Next, embodiments of the present invention will be specifically explained with reference to the drawings.

First Embodiment

Figure 1:
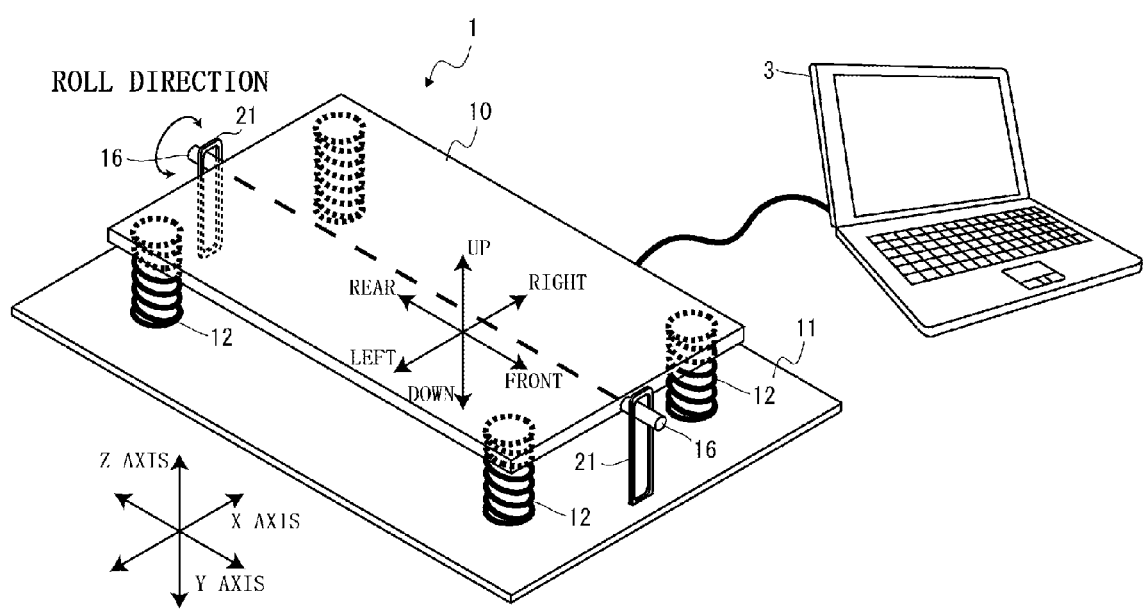
FIG. 1 is a perspective view showing a configuration of a first embodiment of a center-of-gravity detecting system in accordance with the present invention.

Referring to FIG. 1, a center-of-gravity detecting system of a first embodiment includes an oscillation detecting device 1 and a data processing apparatus 3. The oscillation detecting device 1 includes a placement board 10 for placing a detection object thereon, detecting an oscillation (characteristic vibration) of the detection object that is placed on the placement board 10. The data processing apparatus 3 is an information processing apparatus, such as a personal computer, determining the center-of-gravity height and center-of-gravity distance of the detection object on the basis of the oscillation (characteristic vibration) of the detection object that has been detected by the oscillation detecting device 1.

Figure 2A:
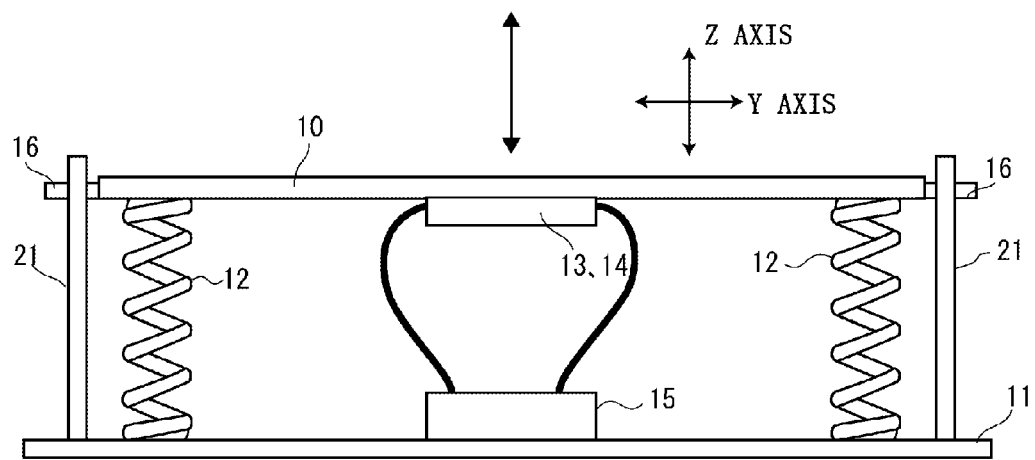
FIG. 2 is a side view of an oscillation detecting device shown in FIG. 1.
Figure 2B:
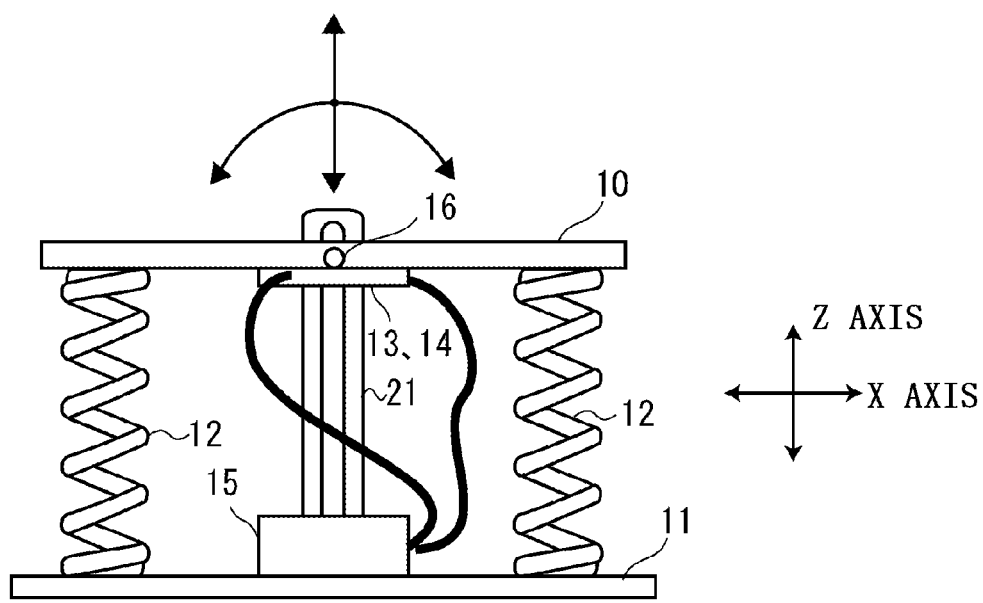

Referring to FIG. 1 and FIG. 2, the oscillation detecting device 1 includes the placement board 10 for placing the detection object thereon, and springs 12 which are planted into a bottom plate 11 for supporting the placement board 10. FIG. 2A is a side view when the oscillation detecting device 1 is viewed from an X-axis direction shown in FIG. 1, while FIG. 2B is a side view when the oscillation detecting device 1 is viewed from a Y-axis direction shown in FIG. 1.

Figure 3:
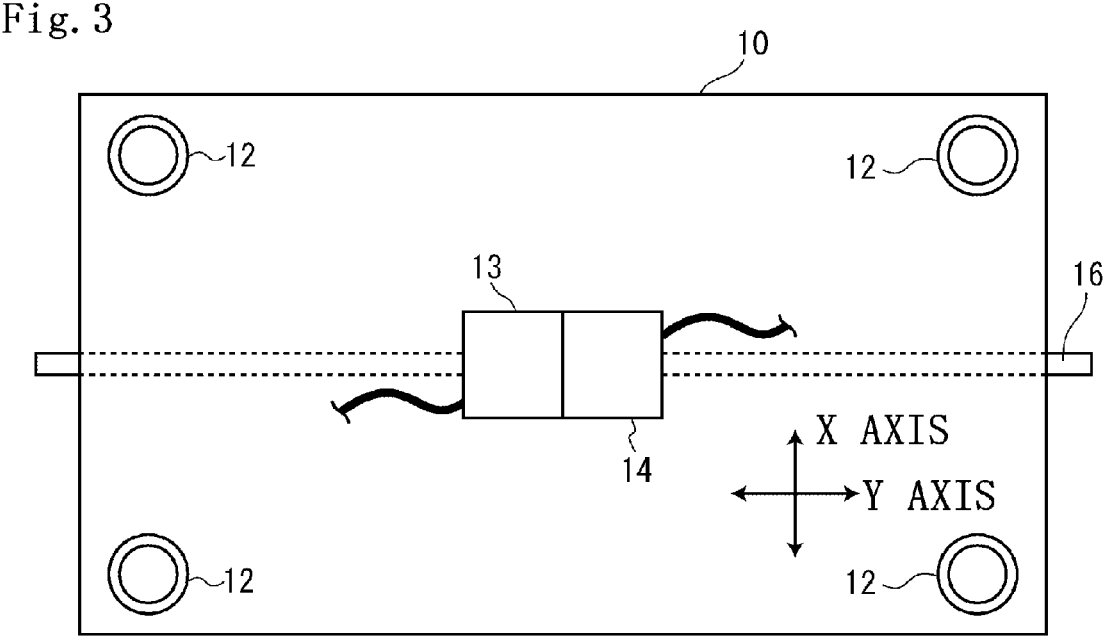
FIG. 3 is an explanatory drawing for explaining the geometry of a placement board and disposition of springs shown in FIG. 2.

Referring to FIG. 1 and FIG. 3, the placement board 10 is a rectangular board having a flat surface functioning as a placing surface on which the detection object can be placed on. In the placement board 10, a roll direction oscillation central axis 16 which is in parallel with the placing surface is formed such that it is protruded from both ends of the placement board 10. FIG. 3 is a figure when the placement board 10 is viewed from the rear side thereof. As the placement board 10, any material, such as wood or plastic, can be used, however, it is preferable that the material be sufficiently lightweight, as compared to the detection object. The placement board 10 is a flat plate with which the weight distribution is uniform, and is configured to have a geometry which is line-symmetrical about the roll direction oscillation central axis 16. Therefore, the center of gravity on the placing surface of the placement board 10 is located on the roll direction oscillation central axis 16.

In the present embodiment, as shown in FIG. 1, the direction perpendicular to the placing surface of the placement board 10 is defined as an up-down direction; the direction parallel to the roll direction oscillation central axis 16 as a front-rear direction; and the direction parallel to the placing surface of the placement board 10 and orthogonal to the roll direction oscillation central axis 16 as a right-left direction. In addition, the self-weight direction in which the gravity acts is defined as a Z-axis direction; the direction which is orthogonal to the Z-axis direction and the front-rear direction, respectively, as an X-axis direction; and the direction which is orthogonal to the Z-axis direction and the right-left direction, respectively, as a Y-axis direction. In the state in which the placement board 10 is level, the up-down direction coincides with the Z-axis direction; the front-rear direction with the Y-axis direction; and the right-left direction with the X-axis direction, respectively.

The springs 12 function as a supporting means for supporting the placement board 10 with an elastic force, being configured such that the placement board 10 is supported with the same elastic force on both sides of the roll direction oscillation central axis 16. In the first embodiment, the springs 12, which are coil-like compression springs, having the same elastic force, are disposed at the four corners of the rectangular placement board 10, respectively, and as shown in FIGS. 2A and 2B, horizontally support the placement board 10 in the state in which no detection object is placed thereon. By thus disposing the springs 12 having the same elastic force line-symmetrically about the roll direction oscillation central axis 16, the placement board 10 can be supported with the same elastic force on both sides of the roll direction oscillation central axis 16. The springs 12 are not limited to the coil-like compression springs, and leaf springs, air springs, or the like, may be used. In addition, provided that the placement board 10 can be supported with the same elastic force on both sides of the roll direction oscillation central axis 16, springs 12 having different elastic forces may be disposed on both side of the roll direction oscillation central axis 16, or the number of springs 12 which are disposed on both side of the same may be varied. Further, the placement board 10 may be configured such that, by using a single or a plurality of springs 12 (for example, a coil-like compression spring, air spring, or the like, having a large diameter) disposed on the roll direction oscillation central axis 16, the placement board 10 is supported with the same elastic force on both sides of the roll direction oscillation central axis 16.

On the rear face of the placement board 10, an acceleration sensor 13 and an angular velocity sensor 14 are provided. With the acceleration sensor 13, the sensitivity axis is adjusted such that the acceleration in the up and down (self-weight) direction (the Z-axis direction shown in FIG. 1), in other words, the vertical oscillation in the up-down direction is detected. In addition, with the angular velocity sensor 14, the sensitivity axis is adjusted such that the angular velocity in a direction of rotation around the roll direction oscillation central axis 16, in other words, the horizontal oscillation in the roll direction around the roll direction oscillation central axis 16 is detected. The acceleration sensor 13 and the angular velocity sensor 14 are not particularly limited, and, for example, a crystal tuning fork type sensor or an oscillation type sensor may be used, and as the acceleration sensor 13 and the angular velocity sensor 14, a three-axis (three dimensional) angular velocity sensor may also be used.

The bottom plate 11 is provided with a pair of X-axis restriction guide parts 21 for restricting the movement of both ends of the roll direction oscillation central axis 16, respectively. In the X-axis restriction guide part 21, an elongated hole the longitudinal direction of which is in the Z-axis direction (self-weight direction) is formed, both ends of the roll direction oscillation central axis 16 being fitted into the respective elongated holes of the X-axis restriction guide parts 21 which are located in opposite positions. Thereby, the roll direction oscillation central axis 16 is moved along the elongated hole in the X-axis restriction guide part 21, and thus the placement board 10 is restricted for movement in the X-axis direction, while being allowed to make a vertical oscillation in the up-down direction, and a horizontal oscillation in the roll direction around the roll direction oscillation central axis 16.

In addition, in the bottom plate 11, an A-D (analog-to-digital) converter 15 is provided in a location where it will not interfere with any of the springs 12. The A-D converter 15 converts analog signals (detection results) outputted from the acceleration sensor 13 and the angular velocity sensor 14 into digital signals to output them to the data processing apparatus 3.

Figure 4:
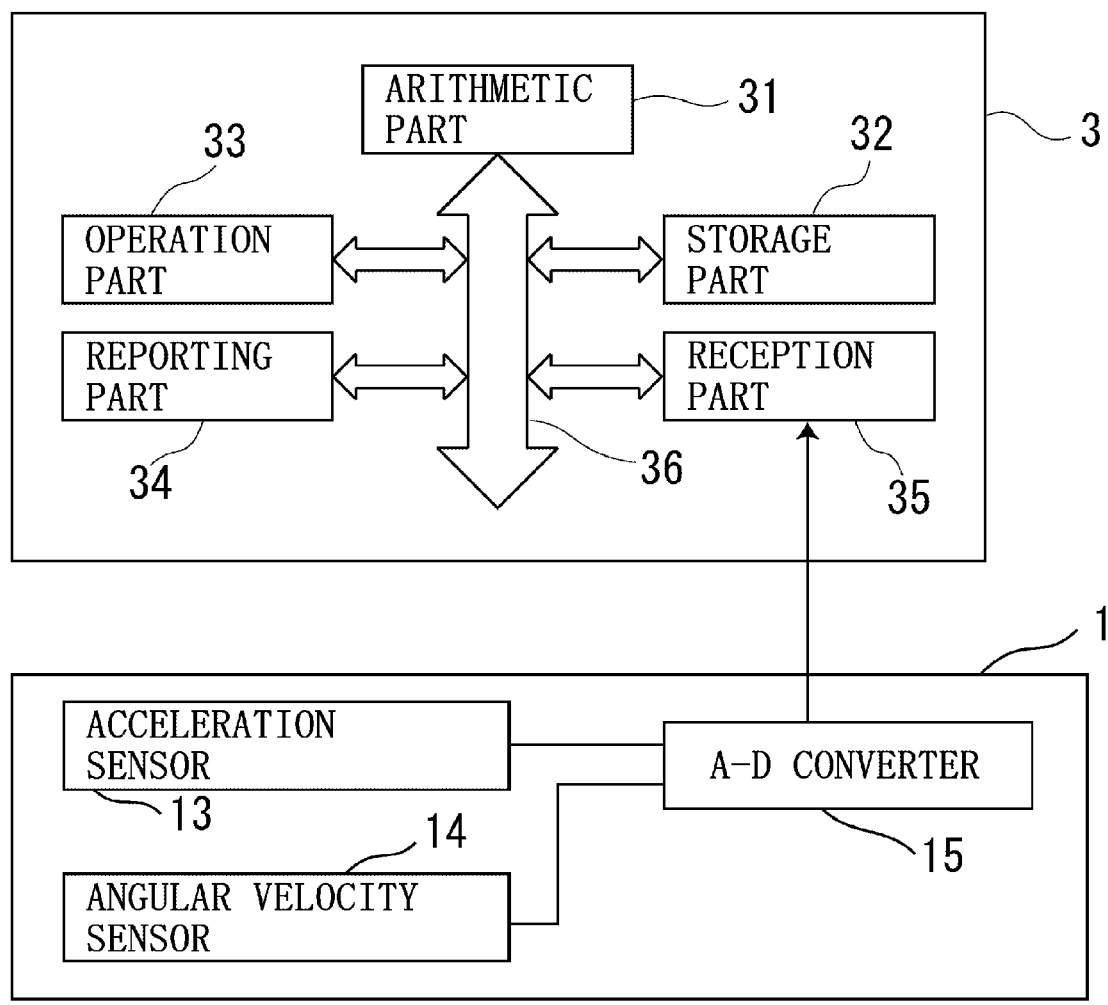
FIG. 4 is a block diagram showing a configuration of a data processing apparatus shown in FIG. 1.

Referring to FIG. 4, the data processing apparatus 3 includes an arithmetic part 31 comprised of a microprocessor, and the like; a storage part 32 comprised of an ROM (read-only memory), an RAM (random access memory), and the like; an operation part 33, such as a keyboard; a reporting part 34, such as a liquid crystal display or a speaker; and a reception part 35, the respective parts being connected by a bus 36.

In the storage part 32, a calculation program for deriving the center-of-gravity location, and various constants to be inputted that are required for the calculation in question are stored. The arithmetic part 31 stores the outputs from the acceleration sensor 13 and the angular velocity sensor 14 in the storage part 32 for a certain period of time on the basis of an operation instruction from the operation part 33. Next, the arithmetic part 31 performs arithmetic processing of the outputs from the acceleration sensor 13 and the angular velocity sensor 14 stored in the storage part 32 according to the calculation program stored in the storage part 32, thereby determining the center-of-gravity location of the detection object that is placed on the placement board 10. The center-of-gravity location of the detection object that has been determined by the arithmetic part 31 is outputted as a display notification or a voice notification from the reporting part 34.

Figure 5A:
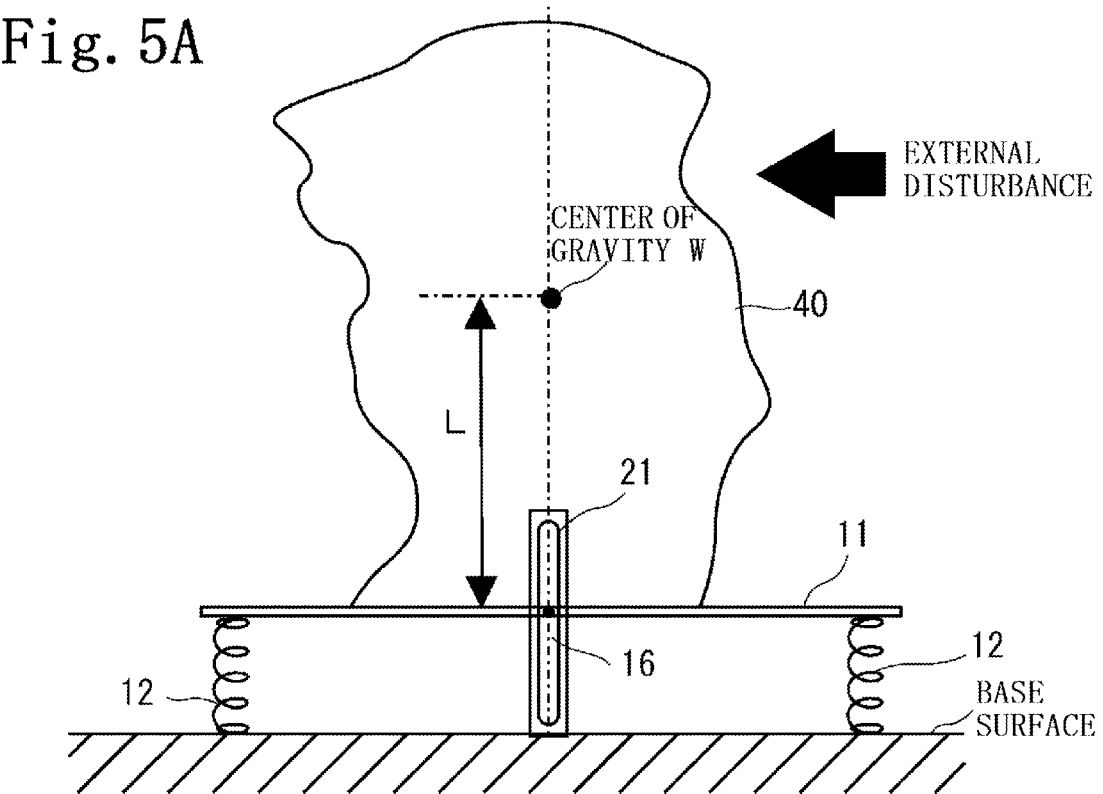

Next, the calculation operation for the center-of-gravity height and center-of-gravity distance of a detection object in the first embodiment will be explained in detail with reference to FIG. 5A to FIG. 7, and FIG. 11. First, as shown in FIG. 5A, the detection object 40 is placed approximately in the center of the placement board 10 of the oscillation detecting device 1. In the state in which the detection object 40 is placed on the placement board 10, the detection object 40 is erected at a level which depends upon the weight and center-of-gravity location of the detection object 40, being supported with the elastic force of the springs 12 which support the placement board 10. In other words, the elastic force of the springs 12 has been set such that, in the state in which the detection object 40 is placed on the placement board 10, the detection object 40 is erected at a level which depends upon the weight and center-of-gravity location thereof.

Next, as shown in FIG. 5A with an arrow, the detection object is subjected to an external disturbance for oscillating the detection object 40 placed on the placement board 10. The external disturbance may be caused to act on the placement board 10, or the oscillation detecting device 1 may be placed on a traveling object, such as a cart or a vehicle, to be subjected to an external disturbance produced by irregularities of the road surface.

If an external disturbance is caused to act on the detection object 40 or placement board 10 with the detection object 40 being placed on the placement board 10, the detection object 40 will make an oscillation (characteristic vibration) as shown in FIGS. 5B and 5C on the basis of a motion having a natural period (frequency) which is dependent on the elastic force of the springs 12, and the total weight and the center-of-gravity location W of the detection object 40. The external disturbance is defined as an external disturbance which generates a horizontal oscillation and a vertical oscillation in the detection object 40 placed on the placement board 10, and is effective if it is caused to act from diagonally above. The motion due to such external disturbance is provided in the state in which the movement in the X-axis direction is restricted by the X-axis restriction guide part 21. Therefore, the acceleration sensor 13 accurately detects the reciprocating motion of the center of gravity W of the detection object 40 in the up-down direction as a vertical oscillation in the up-down direction, while the angular velocity sensor 14 accurately detects the simple pendulum motion of the center of gravity W of the detection object 40 in the roll direction as a horizontal oscillation in the roll direction around the roll direction oscillation central axis 16. The placement board 10 shall be sufficiently light-weight to the detection object, having no effect on the oscillation (characteristic vibration) of the detection object 40.

The detection result (the acceleration in the up-down direction) by the acceleration sensor 13 and the detection result (the angular velocity in the roll direction) by the angular velocity sensor 14 are inputted to the data processing apparatus 3. The data processing apparatus 3 determines the vertical oscillation frequency "v" for the vertical oscillation in the up-down direction from the detection result (the acceleration in the up-down direction) by the acceleration sensor 13, while determining the horizontal oscillation frequency "V" for the horizontal oscillation in the roll direction around the roll direction oscillation central axis 16 from the detection result (the angular velocity in the roll direction) by the angular velocity sensor 14. In addition, from the detection result (the angular velocity in the roll direction) by the angular velocity sensor 14, the data processing apparatus 3 determines the central angle α between the perpendicular center line passing through the roll direction oscillation central axis 16 and the rolling center line giving the center of horizontal oscillation. The central angle α may be determined from the detection result (the acceleration in the up-down direction) by the acceleration sensor 13 and the detection result (the angular velocity in the roll direction) by the angular velocity sensor 14, or may be measured with an inclination sensor, or the like, in a stationary state.

Figure 6B:
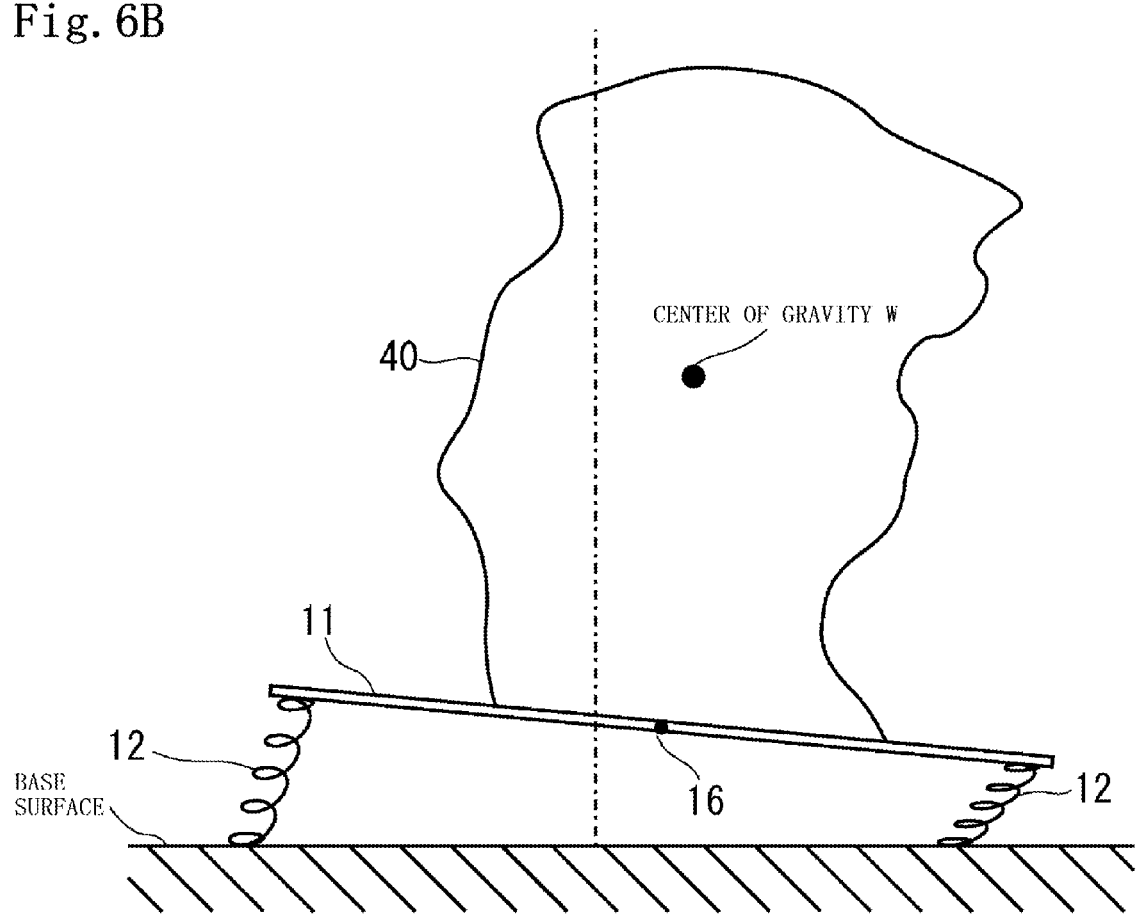

In the case where the movement in the X-axis direction is not restricted by the X-axis restriction guide part 21, the roll direction oscillation central axis 16 will be displaced rightward or leftward with an oscillation of the detection object 40 as shown in FIGS. 6(a) and 6(b). Thereby, the motion of the detection object 40 will become irregular, resulting in the acceleration sensor 13 becoming impossible to provide accurate detection of the reciprocating motion of the center of gravity W of the detection object 40 in the up-down direction, while the angular velocity sensor 14 becoming also impossible to provide accurate detection of the simple pendulum motion of the center of gravity W of the detection object 40 in the roll direction.

As shown in FIG. 5A, assuming that the distance between the springs 12 on both sides of the roll direction oscillation central axis 16 is "b"; the center-of-gravity height in the up-down direction from the roll direction oscillation central axis 16 to the center of gravity W of the detection object 40 is "l"; and the center-of-gravity distance in the right-left direction from the roll direction oscillation central axis 16 to the center of gravity W of the detection object 40 is "s", the center-of-gravity height in the up-down direction, "l", and the center-of-gravity distance in the right-left direction, "s", can be expressed by the following equation, using the vertical oscillation frequency "v", the horizontal oscillation frequency "V" and the central angle α which are determined from the detection results by the acceleration sensor 13 and the angular velocity sensor 14. In the equation, "g" denotes the gravitational acceleration, and "π" the circular constant.

$$l^2 + s^2 = \frac{b^2\pi^2 v^2 - gl}{4\pi^2 V^2 \cos\alpha} \qquad [\text{Math 1}]$$

In addition, the center-of-gravity distance in the right-left direction, "s", can be expressed by the following equation, using the center-of-gravity height in the up-down direction, "l", and the vertical oscillation frequency "v" and central angle α which are determined from the detection result by the acceleration sensor 13.

$$s = \left(\frac{\pi^2 v^2 b^2}{g} - l\right)\tan\alpha \qquad [\text{Math 2}]$$

Further, by substituting [Math 2] for [Math 1], a quadratic equation based on the center-of-gravity height in the up-down direction, "l", is obtained as expressed by the following equation.

$$(1 + \tan^2\alpha)l^2 + \left(\frac{g}{4\pi^2 V \cos\alpha} - \frac{2\pi^2 v^2 b^2}{g}\tan\alpha\right)l + \qquad [\text{Math 3}]$$

$$\frac{\pi^4 v^4 b^4}{g}\tan^2\alpha - \frac{b^2 v^2}{4V^2\cos\alpha} = 0$$

In Math 3, the quadratic coefficient, the linear coefficient, and the constant terms can be defined using the vertical oscillation frequency "v", horizontal oscillation frequency "V" and central angle α which have been determined. Therefore, the data processing apparatus 3 determines the center-of-gravity height in the up-down direction, "l", by operating [Math 3] with the vertical oscillation frequency "v", horizontal oscillation frequency "V" and central angle α which have been determined, and further, determines the center-of-gravity distance in the right-left direction, "s", by operating [Math 2]. Since the center-of-gravity height in the up-down direction, "l", is a height from the roll direction oscillation central axis 16 to the center of gravity W of the detection object 40 in the up-down direction, it is recommended that, in the case where the thickness of the placement board 10 or the radius of the roll direction oscillation central axis 16 is of a value which cannot be neglected, the result of subtraction of the value be determined as the center-of-gravity height in the up-down direction, "l".

Figure 7:
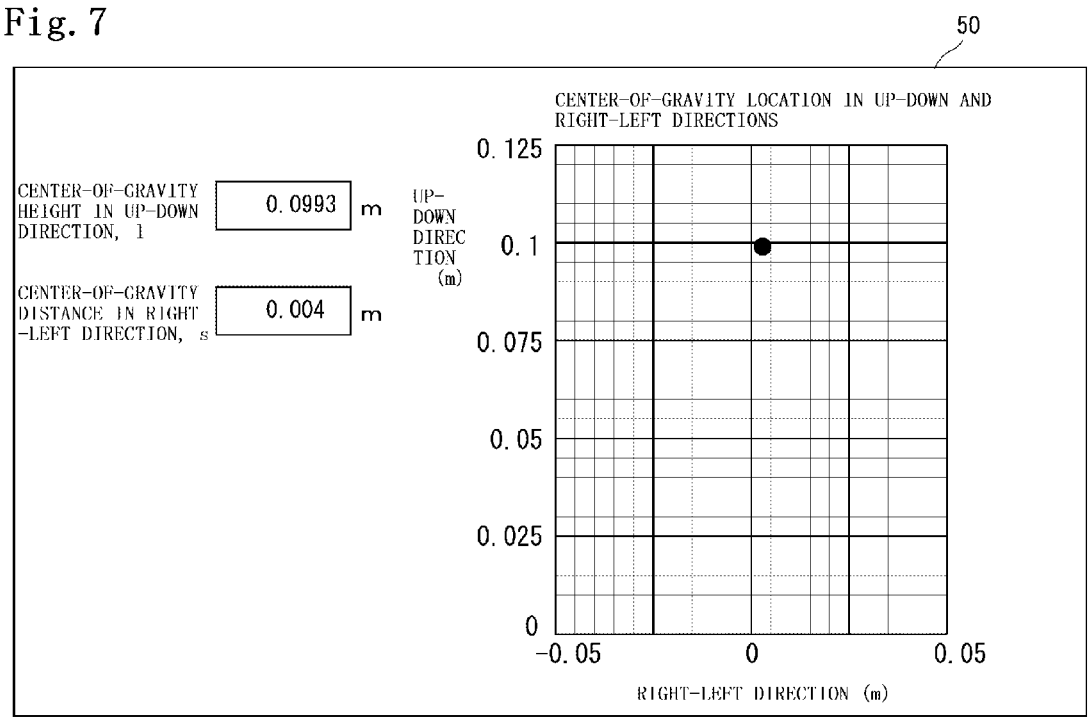
FIG. 7 is a figure giving an example of reporting screen outputted to a reporting part shown in FIG. 4 in the first embodiment of the center-of-gravity detecting system in accordance with the present invention.

Next, the data processing apparatus 3 outputs a reporting screen 50 as shown in FIG. 7, for example, to the reporting part 34 for reporting the center-of-gravity height in the up-down direction, "l", and the center-of-gravity distance in the right-left direction, "s", which have been determined. As shown in the reporting screen 50, by graphing the center-of-gravity height in the up-down direction, "l", and the center-of-gravity distance in the right-left direction, "s", for outputting, the user can visually and simply recognize the center-of-gravity height in the up-down direction, "l", and the center-of-gravity distance in the right-left direction, "s". In addition, in the reporting screen 50, a display column for displaying the vertical oscillation frequency "v", horizontal oscillation frequency "V" and central angle α which have been determined, and an input column for allowing inputting the distance "b" between the springs 12 on both sides of the roll direction oscillation central axis 16, the conditions for the FFT, and the like, may be provided.

Second Embodiment

Figure 8:
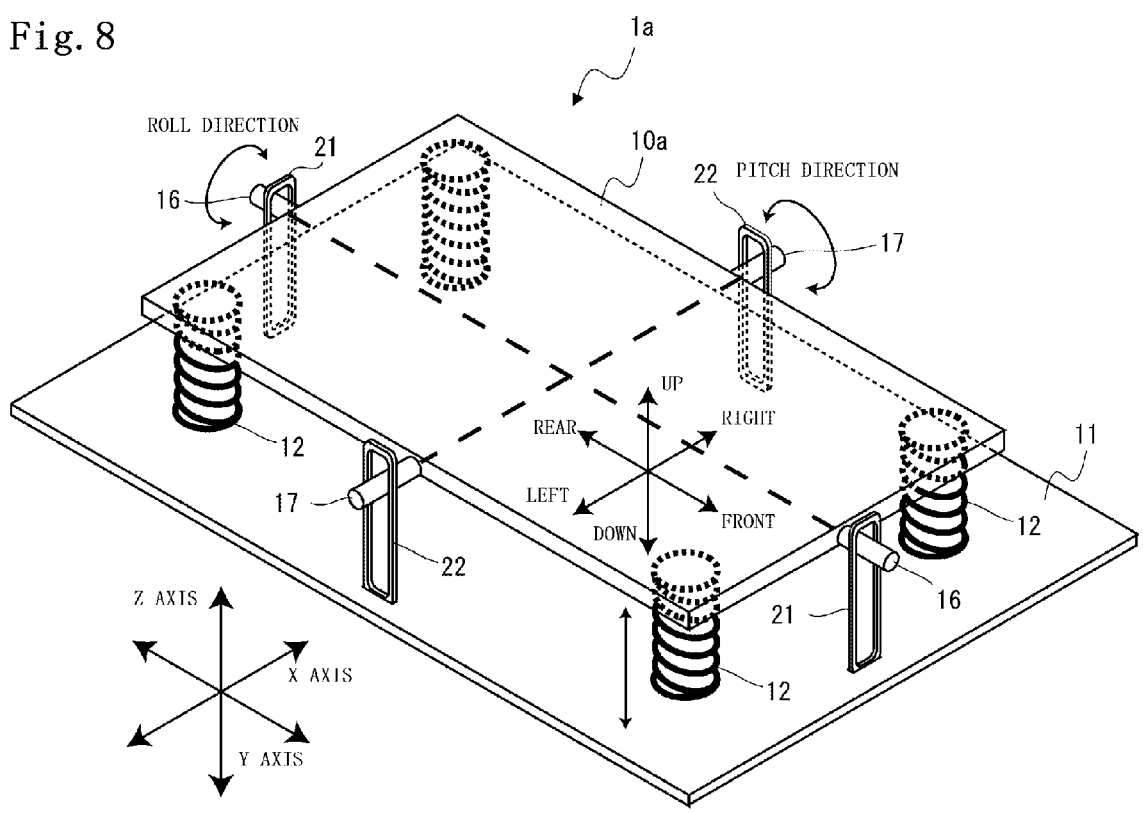
FIG. 8 is a perspective view of a configuration of an oscillation detecting device used in a second embodiment of the center-of-gravity detecting system in accordance with the present invention.

Referring to FIG. 8, an oscillation detecting device 1a of a center-of-gravity detecting system of a second embodiment is provided with a pitch direction oscillation central axis 17 which is parallel to the placing surface and orthogonal to the roll direction oscillation central axis 16 in a placement board 10a, in addition to the configuration of the first embodiment. The pitch direction oscillation central axis 17 is formed such that it is protruded from both ends of the placement board 10a. In addition, the placement board 10a is a flat plate with which the weight distribution is uniform, and is configured to have a geometry which is line-symmetrical about the pitch direction oscillation central axis 17. Therefore, the center of gravity on the placing surface of the placement board 10a is located on an intersecting point of the roll direction oscillation central axis 16 and the pitch direction oscillation central axis 17.

The springs 12 are configured such that the placement board 10a is supported with the same elastic force on both sides of the pitch direction oscillation central axis 17. In the second embodiment, in the same manner as in the first embodiment, the springs 12, which are coil-like compression springs, having the same elastic force, are disposed at the four corners of the rectangular placement board 10a, respectively, being disposed line-symmetrically about the roll direction oscillation central axis 16, while being also disposed line-symmetrically about the pitch direction oscillation central axis 17.

As the angular velocity sensor 14, which is provided on the rear face of the placement board 10a, an angular velocity sensor with more than one axis is used, and the respective sensitivity axes are adjusted such that the angular velocity in a direction of rotation around the pitch direction oscillation central axis 17, in other words, the horizontal oscillation in the pitch direction around the pitch direction oscillation central axis 17 is detected in addition to the angular velocity in a direction of rotation around the roll direction oscillation central axis 16, in other words, the horizontal oscillation in the roll direction around the roll direction oscillation central axis 16.

The bottom plate 11 is provided with a pair of X-axis restriction guide parts 21 for restricting the movement of both ends of the roll direction oscillation central axis 16, respectively, and a pair of Y-axis restriction guide parts 22 for restricting the movement of both ends of the pitch direction oscillation central axis 17, respectively. In the Y-axis restriction guide part 22, an elongated hole the longitudinal direction of which is in the Z-axis direction (self-weight direction) is formed, both ends of the pitch direction oscillation central axis 17 being fitted into the respective elongated holes of the Y-axis restriction guide parts 22 which are located in opposite positions. Thereby, the pitch direction oscillation central axis 17 is moved along the elongated hole in the Y-axis restriction guide part 22, and thus the placement board 10a is restricted for movement in the X-axis direction and the Y-axis direction, while being allowed to make a vertical oscillation in the up-down direction, a horizontal oscillation in the roll direction around the roll direction oscillation central axis 16, and a horizontal oscillation in the pitch direction around the pitch direction oscillation central axis 17. The restriction of movement in the X-axis direction and the Y-axis direction by the X-axis restriction guide part 21 and the Y-axis restriction guide part 22 means that the center of the placement board 10a, in other words, the intersecting point of the roll direction oscillation central axis 16 and the pitch direction oscillation central axis 17 is moved along a vertical line. In other words, if the structure of the placement board 10a is such a structure that the center is allowed to be moved up and down along the vertical line alone, the other portions of the placement board 10a may be moved front-rear, right-left, and up-down in a compound manner.

The detection result (the angular velocity in the pitch direction) by the angular velocity sensor 14 is inputted to the data processing apparatus 3 together with the detection result (the acceleration in the up-down direction) by the acceleration sensor 13 and the detection result (the angular velocity in the roll direction) by the angular velocity sensor 14. Thereby, as in the first embodiment, the data processing apparatus 3 determines the center-of-gravity height in the up-down direction, "l", and the center-of-gravity distance in the right-left direction, "s", on the basis of the detection result (the acceleration in the up-down direction) by the acceleration sensor 13 and the detection result (the angular velocity in the roll direction) by the angular velocity sensor 14. In addition, by the same procedure, the data processing apparatus 3 determines the center-of-gravity height in the up-down direction, "l'", from the pitch direction oscillation central axis 17 to the center of gravity W of the detection object 40, and the center-of-gravity distance in the front-rear direction, "s'", from the pitch direction oscillation central axis 17 to the center of gravity W of the detection object 40 on the basis of the detection result (the acceleration in the up-down direction) by the acceleration sensor 13 and the detection result (the angular velocity in the pitch direction) by the angular velocity sensor 14.

Thus, in the second embodiment, the center-of-gravity height in the up-down direction, "l", on the basis of the detection result (the acceleration in the up-down direction) by the acceleration sensor 13 and the detection result (the angular velocity in the roll direction) by the angular velocity sensor 14 as well as the center-of-gravity height in the up-down direction, "l'", on the basis of the detection result (the acceleration in the up-down direction) by the acceleration sensor 13 and the detection result (the angular velocity in the pitch direction) by the angular velocity sensor 14 are determined, however, an average of both may be outputted, or only one of both may be outputted.

Figure 9:
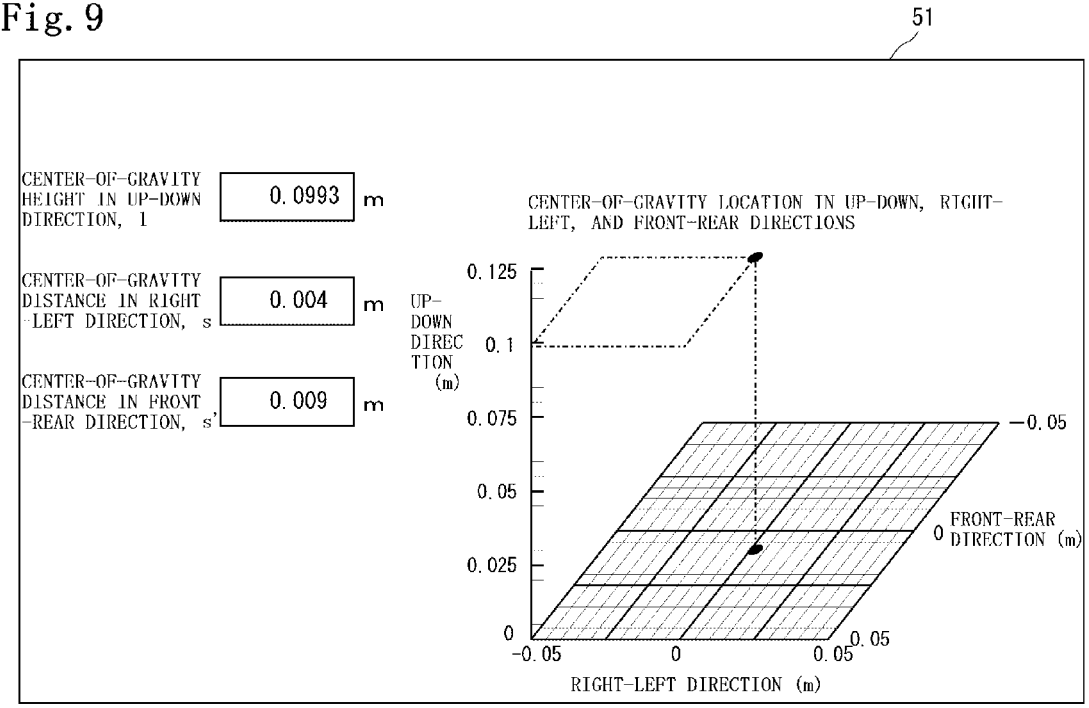
FIG. 9 is a figure giving an example of reporting screen outputted to the reporting part shown in FIG. 4 in the second embodiment of the center-of-gravity detecting system in accordance with the present invention.

Next, the data processing apparatus 3 outputs a reporting screen 51 as shown in, for example, FIG. 9 to the reporting part 34 for reporting the center-of-gravity height in the up-down direction, "l", the center-of-gravity distance in the right-left direction, "s", and the center-of-gravity distance in the front-rear direction, "s'", which have been determined. As shown in the reporting screen 51, by graphing the center-of-gravity height in the up-down direction, "l", the center-of-gravity distance in the right-left direction, "s", and the center-of-gravity distance in the front-rear direction, "s'", for outputting, the user can visually and simply recognize the center-of-gravity height in the up-down direction, "l", the center-of-gravity distance in the right-left direction, "s", and the center-of-gravity distance in the front-rear direction, "s'".

As described above, in the first and second embodiments, there are provided the placement board 10, 10*a* on which the detection object 40 is placed on; the springs 12 for supporting the placement board 10, 10*a* with an elastic force; the acceleration sensor 13 for detecting the reciprocating motion of the detection object 40 in the up-down direction; the angular velocity sensor 14 for detecting a simple pendulum motion of the detection object 40 around the roll direction oscillation central axis 16; and the X-axis restriction guide part 21 for restricting the movement of the placement board 10, 10*a* in the X-axis direction, the data processing apparatus 3 calculating the center-of-gravity height in the up-down direction, "l", from the roll direction oscillation central axis 16 to the center of gravity W of the detection object 40 on the basis of the detection results by the acceleration sensor 13 and the angular velocity sensor 14, thereby the vertical oscillation in the up-down direction and the horizontal oscillation in the roll direction around the roll direction oscillation central axis 16 can be accurately detected, which provides an advantage that, simply by placing the detection object 40 on the placement board 10, and causing an external disturbance to act thereon, the center-of-gravity height of the center of gravity W of the detection object 40, "l", can be accurately calculated.

Further, in the center-of-gravity detecting system of the present invention, the data processing apparatus 3 calculates the center-of-gravity distance in the right-left direction, "s", from the roll direction oscillation central axis 16 to the center of gravity W of the detection object 40 on the basis of the detection results by the acceleration sensor 13 and the angular velocity sensor 14, which provides an advantage that, simply by placing the detection object 40 on the placement board 10, 10*a*, and causing an external disturbance to act thereon, the center-of-gravity distance of the center of gravity W of the detection object 40 in the right-left direction, "s", can be accurately calculated.

Further, in the center-of-gravity detecting system in the second embodiment of the present invention, the angular velocity sensor 14 detects a simple pendulum motion of the detection object 40 around the pitch direction oscillation central axis 17, the Y-axis restriction guide part 22 for restricting the movement of the placement board 10*a* in the Y-axis direction being provided, and the data processing apparatus 3 calculates the center-of-gravity distance in the front-rear direction, "s'", from the pitch direction oscillation central axis 17 to the center of gravity W of the detection object 40 on the basis of the detection results by the acceleration sensor 13 and the angular velocity sensor 14, which provides an advantage that, simply by placing the detection object 40 on the placement board 10*a*, and causing an external disturbance to act thereon, the center-of-gravity distance of the center of gravity W of the detection object 40 in the front-rear direction, "s'", can be accurately calculated. In addition, the X-axis restriction guide part 21 and the Y-axis restriction guide part 22 restrict the movement of the placement board 10*a* in the X-axis direction and the Y-axis direction, thereby the motion of the detection object 40 that is caused in the case where an external disturbance acts thereon is limited to a reciprocating motion in the up-down direction of the detection object, a simple pendulum motion around the roll direction oscillation central axis 16, and a simple pendulum motion around the pitch direction oscillation central axis 17. Therefore, the vertical oscillation in the up-down direction, the horizontal oscillation in the roll direction around the roll direction oscillation central axis 16, and the horizontal oscillation in the pitch direction around the pitch direction oscillation central axis 17 can be further accurately detected, thereby the calculation accuracy for the center-of-gravity height "l" and the center-of-gravity distances "s" and "s'" of the detection object 40 can be improved.

Further, in the center-of-gravity detecting system in the second embodiment of the present invention, the placement board 10*a* has a geometry which is line-symmetrical about the roll direction oscillation central axis 16 and the pitch direction oscillation central axis 17. In addition, the springs 12 are disposed at the four corners of the placement board 10 line-symmetrically about the roll direction oscillation central axis 16 and the pitch direction oscillation central axis 17. Thereby, the vertical oscillation in the up-down direction, the horizontal oscillation in the roll direction around the roll direction oscillation central axis 16, and the horizontal oscillation in the pitch direction around the pitch direction oscillation central axis 17 can be accurately detected as a characteristic vibration of the detection object 40, respectively, thereby the calculation accuracy for the center-of-gravity height "l" and the center-of-gravity distances "s" and "s'" of the detection object 40 can be improved.

Further, in the center-of-gravity detecting system in the second embodiment of the present invention, the roll direction oscillation central axis 16 is formed so as to be protruded from both ends of the placement board 10*a*, the X-axis restriction guide parts 21 restricting the movement of both ends of the roll direction oscillation central axis 16 in the X-axis direction, respectively, and the pitch direction oscillation central axis 17 is formed so as to be protruded from both ends of the placement board 10*a*, the Y-axis restriction guide parts 22 restricting the movement of both ends of the pitch direction oscillation central axis 17 in the Y-axis direction, respectively, thereby a simple configuration can limit the motion of the detection object 40 upon an external disturbance acting thereon to a reciprocating motion of the detection object in the up-down direction, a simple pendulum motion around the roll direction oscillation central axis 16, and a simple pendulum motion around the pitch direction oscillation central axis 17.

Figure 10:
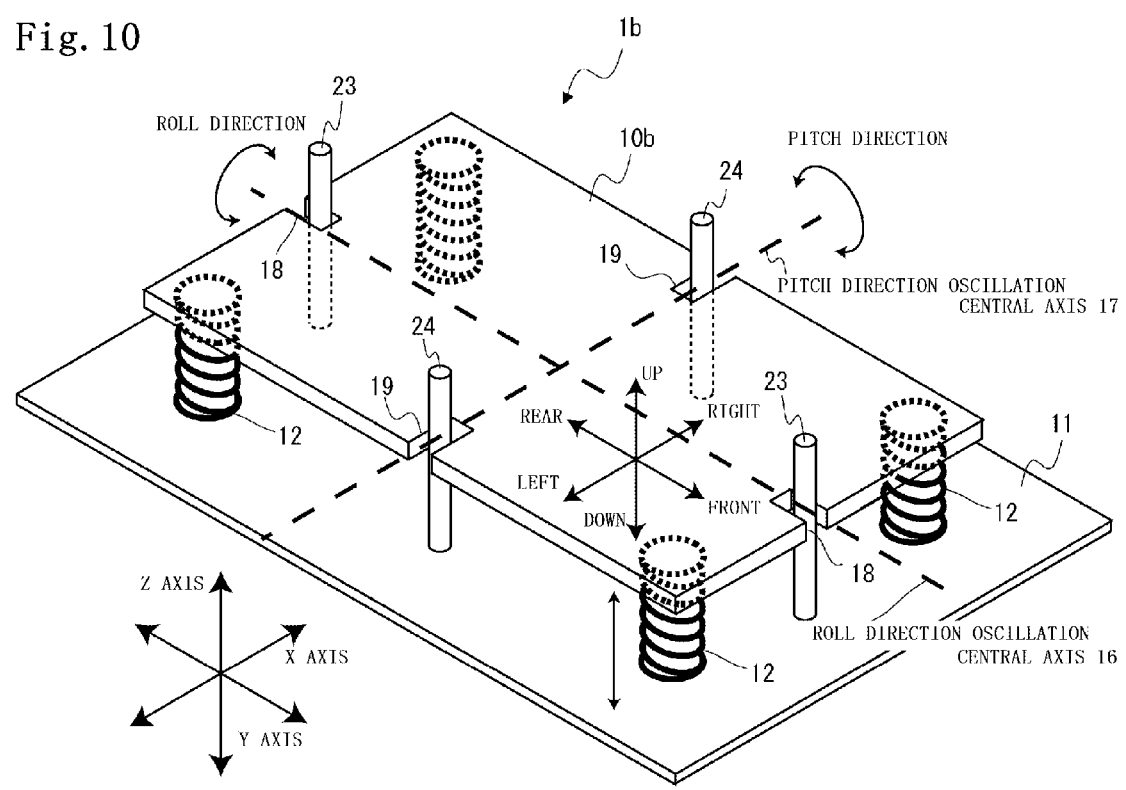
FIG. 10 is a perspective view giving an example of another embodiment of an X-axis restriction guide part and a Y-axis restriction guide part shown in FIG. 8.
Figure 11:
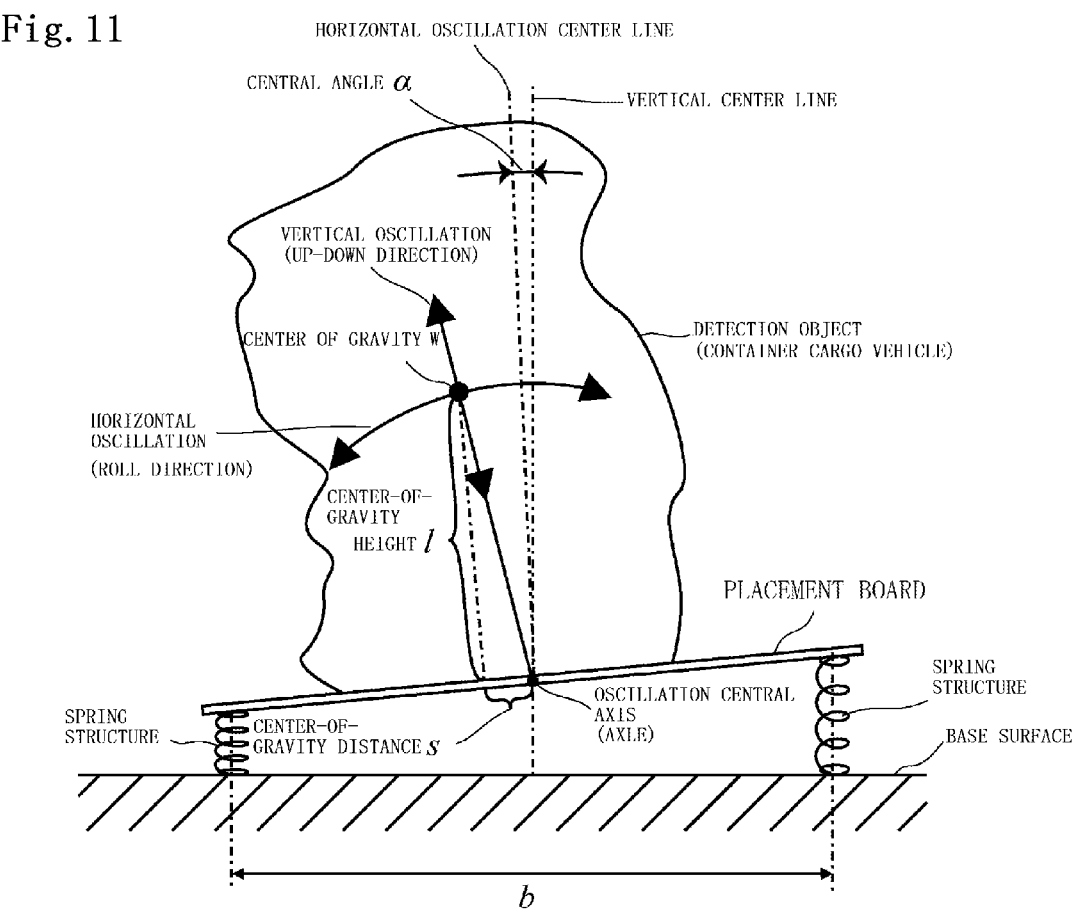
FIG. 11 is an explanatory drawing for explaining a conventional center-of-gravity detection model.

In the first and second embodiments, in the oscillation detecting device 1, 1a, the roll direction oscillation central axis 16 and the X-axis restriction guide part 21 are used as an X-axis direction restriction means for restricting the movement of the placement board 10, 10a in the X-axis direction, however, as an X-axis direction restriction means, another configuration may be adopted. For example, as shown in FIG. 10, in an oscillation detecting device 1b, a pair of cutout parts 18 may be formed in the positions corresponding to both ends of the roll direction oscillation central axis 16, with a pair of X-axis restriction guide bars 23 which are erected on the bottom plate 11 being disposed in locations where they are fitted into the pair of cutout parts 18, respectively, for functioning as an X-axis direction restriction means. In addition, in the second embodiment, in the oscillation detecting device 1a, the pitch direction oscillation central axis 17 and the Y-axis restriction guide part 22 are used as a Y-axis direction restriction means for restricting the movement of the placement board 10a in the Y-axis direction, however, another configuration may be adopted as a Y-axis direction restriction means. For example, as shown in FIG. 10, in the oscillation detecting device 1b, a pair of cutout parts 19 may be formed in the positions corresponding to both ends of the pitch direction oscillation central axis 17, with a pair of Y-axis restriction guide bars 24 which are erected on the bottom plate 11 being disposed in locations where they are fitted into the pair of cutout parts 19, respectively, for functioning as an Y-axis direction restriction means.

It is obvious that the present invention is not limited to the above respective embodiments, and within the technical scope of the present invention, the respective embodiments may be altered as appropriate. In addition, the number, location, geometry, and the like, of the above-mentioned component members are not limited to those as given in the embodiments, and may be altered into a number, location, geometry, and the like, which are suited for implementing the present invention. In each figure, the same component is provided with the same sign.

DESCRIPTION OF SYMBOLS 1, 1a denotes an oscillation detecting device; 3 a data processing apparatus; 10, 10a a placement board; 11a bottom plate; 12 a spring (supporting means); 13 an acceleration sensor; 14 an angular velocity sensor; 15 an A-D converter; 16 a roll direction oscillation central axis; 17 a pitch direction oscillation central axis; 21 an X-axis restriction guide part; 22 a Y-axis restriction guide part; 40 a detection object; and 50, 51 a reporting screen.

The invention claimed is:

1. A center-of-gravity detecting system, comprising:
a placement board for placing a detection object thereon;
a supporting means for supporting said placement board with an elastic force;
an up-down direction detection means for detecting a reciprocating motion of said detection object in an up-down direction perpendicular to said placement board;
a roll direction detection means for detecting a simple pendulum motion of said detection object around a roll direction oscillation central axis parallel to said placement board;
an X-axis direction restriction means for restricting a movement of said placement board in an X-axis direction orthogonal to a gravity-acting Z-axis direction and said roll direction oscillation central axis, respectively; and a data processing means for calculating a center-of-gravity height in said up-down direction from said roll direction oscillation central axis to the center of gravity of said detection object on the basis of the detection results by said up-down direction detection means and said roll direction detection means.

2. The center-of-gravity detecting system according to claim 1, wherein said data processing means calculates a center-of-gravity distance in a right-left direction orthogonal to said up-down direction and said roll direction oscillation central axis, respectively, from said roll direction oscillation central axis to the center of gravity of said detection object on the basis of the detection results by said up-down direction detection means and said roll direction detection means.

3. The center-of-gravity detecting system according to claim 2, wherein a pitch direction detection means for detecting a simple pendulum motion of said detection object around a pitch direction oscillation central axis orthogonal to said up-down direction and said roll direction oscillation central axis, respectively; and
a Y-axis direction restriction means for restricting a movement of said placement board in a Y-axis direction orthogonal to a gravity-acting Z-axis direction and said pitch direction oscillation central axis, respectively, are provided,
said data processing means calculating a center-of-gravity distance of said detection object on said placement board on the basis of the detection results by said up-down direction detection means and said pitch direction detection means.

4. The center-of-gravity detecting system according to claim 3, wherein said placement board has a geometry which is line-symmetrical about said roll direction oscillation central axis and said pitch direction oscillation central axis.

5. The center-of-gravity detecting system according to claim 4, wherein said supporting means is comprised of a plurality of spring means having an identical elastic force,
said spring means being disposed line-symmetrically about said roll direction oscillation central axis and said pitch direction oscillation central axis.

6. The center-of-gravity detecting system according to claim 5, wherein
said X-axis direction restriction means is comprised of said roll direction oscillation central axis which is formed so as to be protruded from both ends of said placement board, and a pair of X-axis restriction guide means for restricting a movement of both ends of said roll direction oscillation central axis in said X-axis direction, respectively, and
said Y-axis direction restriction means is comprised of said pitch direction oscillation central axis which is formed so as to be protruded from both ends of said placement board, and a pair of Y-axis restriction guide means for restricting a movement of both ends of said pitch direction oscillation central axis along said Y-axis direction, respectively.

7. A center-of-gravity detecting system, comprising:
a placement board for placing a detection object thereon;
a supporting means for supporting said placement board with an elastic force;
an up-down direction detection means for detecting a reciprocating motion of said detection object in an up-down direction perpendicular to said placement board;
a roll direction detection means for detecting a simple pendulum motion of said detection object around a roll direction oscillation central axis parallel to said placement board;

a pitch direction detection means for detecting a simple pendulum motion of said detection object around a pitch direction oscillation central axis orthogonal to said up-down direction and said roll direction oscillation central axis, respectively;

a movement direction restriction means for restricting a movement of the center of said placement board to said up-down direction; and a data processing means for calculating a center-of-gravity height in said up-down direction from said roll direction oscillation central axis to the center of gravity of said detection object and a center-of-gravity distance of said detection object on said placement board on the basis of the detection results by said up-down direction detection means and said roll direction detection means.

* * * * *